United States Patent [19]

Hukuta et al.

[11] 4,160,511
[45] Jul. 10, 1979

[54] DEVICE FOR CAPPING SUPPLYING OPENING OF FUEL-TANK

[75] Inventors: Masakazu Hukuta, Tsushima; Hirotsugi Kobayashi, Aichi, both of Japan

[73] Assignee: Kabushiki Kaisha Tokai Rika Denki Seisakusho, Aichi, Japan

[21] Appl. No.: 940,508

[22] Filed: Sep. 7, 1978

[30] Foreign Application Priority Data

Sep. 12, 1977 [JP] Japan .......................... 52-122557[U]

[51] Int. Cl.² ............................................. B65D 55/14
[52] U.S. Cl. ..................................... 220/210; 70/167
[58] Field of Search .................. 220/210; 70/163, 164, 70/165, 166, 167, 168, 170, 171; 296/1 C

[56] References Cited

U.S. PATENT DOCUMENTS 3,915,335  10/1975  Shanklin et al. ................. 220/210 X
3,998,353  12/1976  Farelli ................................... 220/210
4,107,961  8/1978   Evans ................................. 220/210 X Primary Examiner—George T. Hall
Attorney, Agent, or Firm—Wenderoth, Lind & Ponack

[57] ABSTRACT

A device for capping a supplying opening of a fuel-tank of a motor vehicle or the like, comprises a capping outer casing of T-shaped cross section, and cylinder-lock means centrally mounted inside the outer casing for holding and releasing a locking condition, wherein although a distance frictionally driven by respective projections mounted on a rotary member against resilient force is fully, automatically relaxed to permit respective locking bars to be projected for locking and thus, the device is locked when a key fitted in cylinder-lock means is left in a free condition, the key fitted is arranged to be not detachable from cylinder-lock means without further manual actuation thereof in the same direction of the free returning direction thereof.

4 Claims, 5 Drawing Figures

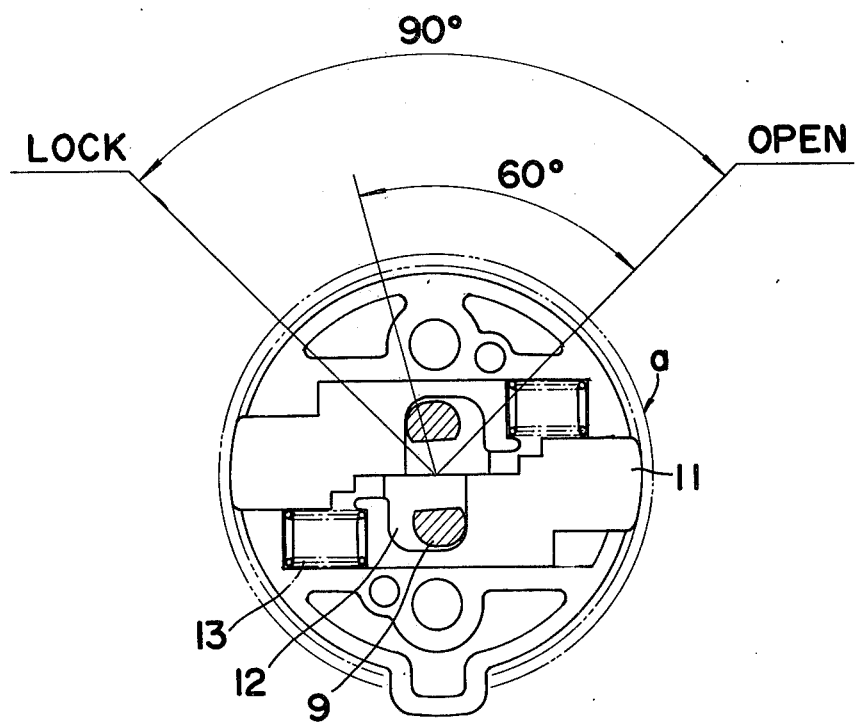

DEVICE FOR CAPPING SUPPLYING OPENING OF FUEL-TANK

BACKGROUND OF THE INVENTION

This invention relates to a capping device, and more particularly, to a device for capping a supplying opening of a fuel-tank of a motor vehicle or the like, which can be effectively handled by a user's single hand when it is especially to be detached from the supplying opening.

According to a capping device of the conventional type, the device, generally, includes springs associated with cylinder-lock means which is arranged not only to urge locking bars thereof to be projected, but also to simply make a rotary member to be driven to a locking angle through the resilient force thereof and yet, the key fitted is detachable when the actuation concerned is released.

Therefore, when the capping device is to be detached from the supplying opening of the fuel-tank, the key fitted into the rotary member being turned up to the releasing angle in order to withdraw the locking bars projected by the user's one hand, with the other hand simultaneously grasping a peripheral portion of the device to relatively fix the device with respect to the key fitted as well as to withdraw an lower portion thereof from the inner portion of the supplying opening, the device, as a whole, must be successively withdrawn from the fuel-tank with the hand which is grasping the peripheral portion mentioned above.

As is clear from the description in the foregoing, the capping device of the above described type can not be handled by the user's single hand when the capping device is to be fully detached from the fuel-tank.

Although a part except for the fitting key inserted, which is available for pushing and holding the device toward the supplying opening with the fitting key simultaneously being actuated to be maintained in the releasing angle against the resilient force of the springs concerned, is easily found due to its conventional T-shaped cross section when the capping device is to be attached into the supplying opening, the detaching process concerning the device of the conventional type, however, requires the handling portion for grasping the device, as a whole, due to the reason mentioned above and thereby, the handling portion is ordinarily provided.

However, the portion projected from the rest of the portion under the capping condition, which is naturally provided on the top surface of the capping device, not only spoils the external appearance, but also may even bring about accidents due to its projections when the device of this type is equipped to a motor vehicle or the like.

Furthermore, there is more possibility for the user to be soiled in detaching the device from the supplying opening than in attaching thereof into said supplying opening, since the portion of the device inserted into the fuel-tank has been usually soiled by oil. Therefore, from the view point of the work concerning the capping device, it is desirable that the device is arranged to be detachable from the supplying opening of the fuel-tank in a manner such that the user can handle the device with the least contact with it as far as possible.

SUMMARY OF THE INVENTION

Accordingly, an essential object of the present invention is to provide a device for capping a supplying opening of a fuel-tank of a motor vehicle or the like, which can be effectively handled by a user's single hand when it is especially to be detached from the supplying opening.

Another important object of the present invention is to provide a device for capping a supplying opening of a fuel-tank of the above described type, which is simple in structure and highly efficient in use.

A further object of the present invention is to provide a device for capping a supplying opening of a fuel-tank of the above described type, which is formed into compact and simple configurations, and can be manufactured at low cost.

In accomplishing these and other objects, according to one preferred embodiment of the present invention, there is provided a device for capping a supplying opening of a fuel-tank of a motor vehicle or the like, which comprises a capping outer casing of T-shaped cross section, including a covering portion for directly covering an annular, peripheral surface of the supplying opening therewith, a plug portion to be closely fitted to the inner cylindrical surface of the supplying opening of the fuel-tank, a pair of projectable locking bars accommodated in the lower portion thereof and an annular packing stuff of elastic material lining the lower surface of the covering portion mentioned above, while the packing stuff itself is further lined with an annular leaf spring, so that the covering portion to seal the supplying opening of the fuel-tank can be closely urged to the annular peripheral surface of the opening, with the portion thereof which directly faces the annular peripheral surface being resiliently pushed back when forcibly attached, and cylinder-lock means including an attachable key centrally mounted inside the outer casing for holding and releasing a locking condition with a pair of locking bars through the locking bar and the lid of the inner wall of the opening arrangement.

More specifically, a rotary member fitted into the holder comprising cylinder-lock means is provided with a pair of eccentric pins mounted on the bottom surface thereof while an aperture and its successive connectors for actuating the rotary member itself by the fitting key therethrough is provided at a top surface. Each eccentric pin is arranged to loosely project into each recess of the projectable locking bar accommodated and being backwardly positioned by a spring in each groove formed in a bottom portion of the plug portion, whereby the pair of locking bars, each positioning and directing in the radially reverse direction with each other as well as radially extending through each aperture formed on an outer shell of the plug portion, are accommodated inside the outer shell, when each recess is frictionally driven by each eccentric bar which is driven by a fitting key.

Furthermore, according to the present invention, although a distance frictionally driven by the respective projection mounted on the rotary member against the resilient force of the spring concerned described in the foregoing is fully, automatically relaxed to permit the locking bars to be projected and thus, the device is locked when the fitting key fitted in the cylinder-lock means is left in the free condition, the fitting key is arranged to be not detached from the cylinder-lock means without further manual actuation thereof in the same direction mentioned above.

Therefore, as is clear from the only by description, by the arrangement mentioned above, since the device can not be perfectly, automatically brought back to the normally locking condition to permit the fitting key to be fitted to or especially detached from the cylinder-lock means without further actuation of the fitting key to the direction mentioned above, the device, which has once disengaged a bar-lid engagement and fully unlocked by the key fitted can be successively withdrawn from the opening onlyby continuously pulling the key still fixedly fitted thereto in the course of the detaching thereof, whereby the device is arranged to be detachable from the supplying opening of the fuel-tank, by just pulling the key thereof with the user's single hand.

BRIEF DESCRIPTION OF THE DRAWINGS

These and other objects and features of the present invention will become apparent from the following description taken in conjunction with the preferred embodiment thereof with reference to the accompanying drawings in which;

FIG. 5 is a view similar to FIG. 3, but particularly showing a relationship between a releasing angle and an autorelaxing angle concerning the device of the present invention.

Before the description of the present invention proceeds, it is to be noted that like parts are designated by like reference numerals throughout several views of the accompanying drawings.

DETAILED DESCRIPTION OF THE INVENTION

Figure 1:
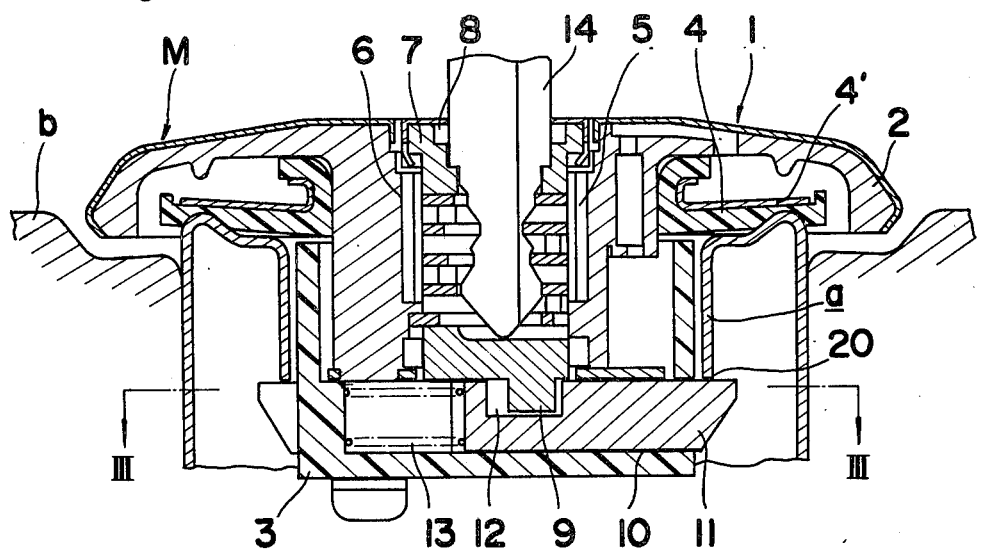
FIG. 1 is a side sectional view of a device for capping a supplying opening of a fuel tank of the present invention, the device being in a locked state.
Figure 2:
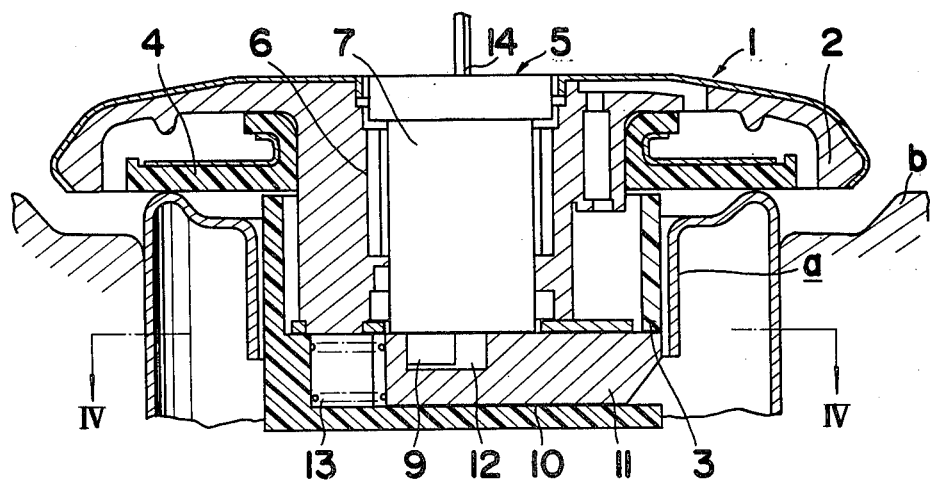
FIG. 2 is a side elevational view, partly in section of the device shown in FIG. 1, but showing an unlocked state.

Referring now to the drawings, there is shown in FIGS. 1 to 5, one preferred embodiment of the present invention, in which a device for detachably capping a supplying opening a of a fuel-tank b, comprises a capping outer casing 1 of T-shaped cross section, including a covering portion 2 forming a top portion thereof for directly covering a peripheral surface of the supplying opening a therewith, a plug portion 3 closely fitted to the inner cylindrical surface of the supplying opening a, and an annular packing stuff 4 of elastic material lining the rear or lower surface of the covering portion while said packing stuff 4 itself further being lined with an annular leaf spring 4' so that the covering portion 2 to seal said supplying opening a of the fuel-tank can be closely urged to the peripheral surface of the opening a with the partial portion directly facing the peripheral surface being resiliently pushed back when forcibly attached, and cylinder-lock means 5 centrally mounted inside said outer casing 1 for holding a sealing condition with a pair of locking bars 11 actuated therewith as will be specifically described hereinbelow.

More specifically, cylinder-lock means 5 mentioned above comprises a casing or a holder 6 formed as a lower portion of the covering portion 2 mentioned above, which may otherwise be fixedly mounted on the covering portion 2, and a rotary member 7 fitted into the holder 6, while the top surface of the rotary member constitutes a portion of the top surface of the covering portion therewith, which can rotate with respect to a longitudinal axis of the holder 6. Furthermore, an aperture 8 leading to successive connecting layers comprising a part of the rotary member 7 to actuate said rotary member 7 by a fitting key 14 therethrough is provided at a top surface of the covering portion 2 or the rotary member 7, while a pair of eccentric pins 9 are mounted on the bottom surface 7 and yet, each outer semi-circumferential surface thereof is arranged outwardly to superimpose along the circumference of the rotary member 7 mentioned above respectively, so that each eccentric pin 9 may be projected into a respective recessed portion 12 of the locking bar 11 loosely accommodated in the respective groove 10 formed in a bottom, internal portion of the plug portion 3 mentioned earlier.

Figure 3:
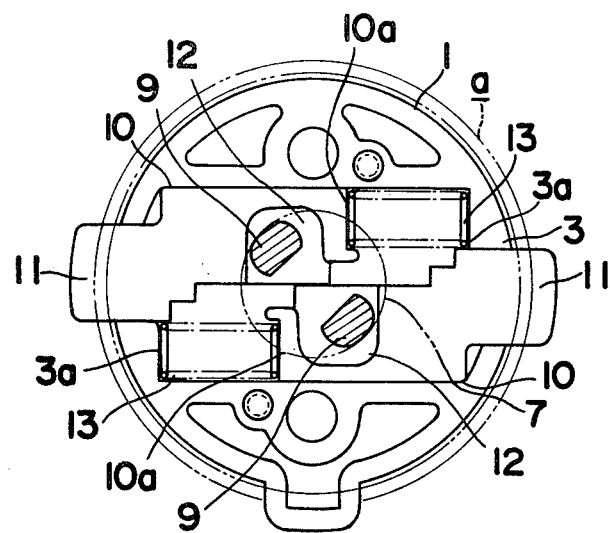
FIG. 3 is a top plan view, partly in section taken along the line III—III of FIG. 1.
Figure 4:
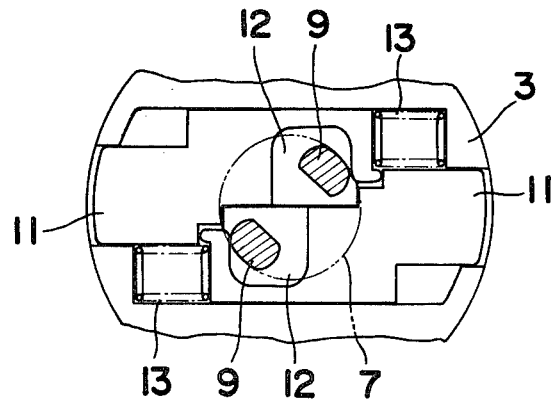
FIG. 4 is a fragmentary sectional view taken along the line IV—IV of FIG. 2.

As specifically shown in FIG. 3, the bottom portion of the plug portion 3 comprises a pair of grooves 10 nearly centrally lined and parallel with each other in the radial direction, the pair of locking bars 11 whose each bar is slidably accommodated in the respective grooves 10 while positioned and directed in the radially reverse direction with each other so that the leading portion of the respective locking bar of the pair can be extended reversely in radial direction with each other through each aperture formed on an outer shell of the plug portion 3, and a spring 13 interposed between a stop 3a formed on a groove 10 and a recessed back surface 10a of the locking bar 11 to normally force the leading portion of the respective locking bar 11 to be projected from the outer circumferential surface mentioned above.

According to the embodiment of the present invention, provided that the rotary member 7 of the cylinder-lock means 5 is maintained in a certain normal locking state as will be specifically described hereinbelow, the inserting and fitting of the fitting key 14 to the rotary member 7 to actuate it or the vise versa can only be accomplished, wherein a certain, engageable angle is arranged to be brought about by the mutual, constructual correlation among members comprising the rotary member 7.

However, when the device M of the present invention is brought about to a locking condition, or more specifically, the rotary member 7 is maintained in the locking state mentioned above, each locking bar 11 is arranged to be projected from the outer circumference of the plug portion 3 to present the locking condition therewith.

On the contrary to the locking actuations described above, as specifically shown in FIGS. 2 and 4, when the fitting key 14 having been inserted into the aperture 8 and thereby, the rotary member 7 is rotatably driven to a releasing angle, the projection or eccentric pin 9 loosely engaged with the recessed portion 12 formed in the locking bar 11 therebelow is arranged to successively, frictionally drive the locking bar at an inner wall of the recessed portion 12 with its peripheral circumference, following the rotational movement of the rotary member 7 actuated by the fitting key 14, whereby the leading portion thereof is to be accommodated inside the circumferential surface of the plug portion 3 against the resilient force of the spring 13 mentioned in the foregoing.

More specifically, as long as each leading portion of the locking bar 11 remains in the normal condition, in which the inserting and fitting of the key 14 to the rotary member 7 is possible as described in the foregoing, the fitting key 14 for actuating cylinder-lock means 5 is arranged to have to turn round through 90 degrees with respect to the initially inserting position thereof so that the leading portion of the locking bar 11 is completely accommodated inside the plug portion 3.

However, as shown in FIG. 5, the accomplishment of turning the fitting key 14 round through 90 degrees with respect to the initially fitting position thereof to detach the device from the supplying opening includes an initial stage specially arranged to be turned round through 30 degrees with respect to the fitting position mentioned above, and the successive second stage to be further turned round through 60 degrees, and which turning angle of 60 degrees is arranged to be substantially equivalent to a distance of the friction drive by the projection 9 mounted on the rotary member 7 at the bottom end thereof along the circle equivalent to the circumference of the rotary member 7 against the resilient force of the specific spring 13 concerned. Therefore, the successive actuation of the fitting key 14 is released, the angle mentioned above, i.e., 60 degrees associated with the fitting key 14 is automatically relaxed by the resilient force of the spring 13 mentioned above, wherein on the contrary to the situation described above, the recessed portion 12 of the locking bar 11 resiliently moved by the spring 13 reversely drives the respective projection to permit the leading portion to be again projected from the outer circumference of the plug portion 3. The rest angle, 30 degrees, i.e., an initial effecting angle as shown in FIG. 5, is specifically arranged to be maintained and unrelaxed unless the further actuation is effected, and the reason of which will be mentioned hereinbelow.

The operational characteristics in connection with the mechanical characteristics of the device for detachably capping a supplying opening of a fuel-tank of the present invention are as follows.

In the situation of the present invention being accomplished, in which the device M caps the supplying opening a of a fuel-tank b with its pair of bars 11 radially engaging with an inner lid 20 of the supplying opening a, if the fitting key 14 is inserted and then, turned around nearly 90 degrees, or the proper, releasing angle of disengagement which might be less than 90 degrees, depending upon the locking depth of the locking bar 11 with the lid 20, the capping body 1 of T-shaped cross section, as a whole, is successively lifted with respect to the top peripheral part of the supplying opening a, since the capping body itself have been forcibly urged downward against the resilient force of the leaf spring 4' lining the covering portion 2 thereof when attached.

As soon as the locking bars 11 are disengaged from the lid 20 or once inwardly accommodated inside the plug portion 3, the capping body successively lifted as described above. However, since the fitting key 14 itself can not still be detached from the cylinder-lock means 5 due to the reason as mentioned earlier, the device M itself, as a whole, can be drawm upward by pulling the fitting key 14 still fixed thereto while the bar 11 is now resiliently extended to fit and contact the inner surface of the opening a. Therefore, the device itself can be detached from the supplying opening a only by pulling the fitting key 14 until the device M completely detached the supplying opening a. Successively, as soon as the device M fully detached from the supplying opening a, the each locking bar 11 is again, fully projected by means of the resilient force of the each spring 13 concerned. Naturally if the fitting key 14 is further turned round beyond the angle automatically relaxed, the fitting key 14 is now to be detached from the device M itself.

On the contrary to the detaching procedure of the present invention mentioned above, the attaching process of the present invention to the supplying opening a is as follows.

When the device M is to be attached to the opening a, the plug portion 3 of the device is slidably inserted into the opening a till the locking bar to be projected reaches down to the lid 20 of the opening, while the locking bar has to be kept to be accommodated inside the plug portion 3 of the device by holding the fitting key 14 in a manner as described in the foregoing, wherein the fitting key 14 is inevitably inserted into the rotary member 7 of the device during the attaching process thereof. Once, the each locking bar 11 is engaged with the lid 20 with the device being vertically urged as mentioned above and fully projected below the edge of the lid 20, the key 14 can be detached from the device if the fitting key 14 is further turned beyond the automatically relaxed angle.

Furthermore, as long as the each locking bar is incompletely projected, the fitting key 14, of cause, can not be detached from the cylinder-lock means 5. This is a prominent characteristic of the present invention, because the complete capping condition can be easily confirmed only if the fitting key 14 is to be detached or not.

Accordingly, there is no anxiety about oil leakage from the oil-tank which might be brought about in the course of the driving, if the cap of the oil-tank is not properly applied.

As is clear from the description in the foregoing, the device for detachably capping a supplying opening of the present invention is brought to the locking condition thereof or the vise versa only by the engagement and disengagement between the projectable locking bars and the inner lid of the opening to be capped, wherein the actuation of the each locking bar is simply accomplished through the friction drive caused by the engagement between the pair of recessed portions thereof and the pair of the eccentric projections formed on the rear surface of the rotary member comprising the cylinder-lock means.

Furthermore, the device itself is arranged in a manner such that the rotary member brought to the releasing condition by the fitting key thereof, can not be perfectly, automatically brought back to the normally locking condition to permit the fitting key to be fitted to or detached from the cylinder-lock means without further actuation of the fitting key, whereby the device which once disengaged said bar-lid engagement and fully unlocked, can still be withdrawn from the opening only by continuously pulling the key still fitted thereto in the course of the detaching, and thereby, the capping device itself is to be detached from the oil-tank without any user's direct contact to the fuel-tank.

Moreover, by the arrangement mentioned above, the detaching of the capping means from the fuel-tank is quite easily accomplished by a user's single hand operation, when the fuel is supplied to the fuel-tank.

Furthermore, since the arrangement of the present invention does not make it possible to cap as well as to lock the capping means with the fitting key being detached therefrom, because of the fitting key being not in a detachable condition thereof through its automatic relaxation process as soon as the actuation for unlocking is released, the fitting key could not be left behind in the course of the fuel-supplying periods including the detaching process of the capping means from the fuel-tank.

Still furthermore, the arrangement of the present invention described in the foregoing, in which the capping means itself can be fully detached from the oil-tank by just pulling the key fitted thereto, does not require any further arrangements to handle the capping means for detaching it from the fuel-tank, whereby the device can be quite compactly designed in its external appearance, omitting any undesirable portion projected which might be otherwise required as often seen in the capping means of the conventional type.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A device for capping a supplying opening of a fuel-tank of a motor vehicle and the like, comprises a capping outer casing, including a covering portion for covering an upper peripheral surface of said supplying opening therewith, a plug portion to be closely fitted to an inner surface of said supplying opening therewith, and means for maintaining said covering portion in a resilient condition when said covering portion is forcibly attached to said supplying opening, a pair of locking bars accommodated in a lower portion of said plug portion, said locking bar being backwardly positioned by resilient member to project from a shell of said plug portion, and cylinder-lock means mounted on said outer casing, said cylinder-lock means including a rotary member, a pair of lugs mounted on said rotary member for frictionally driving said locking bars when said rotary member is actuated, and a detachable key for actuating said rotary member, said rotary member being arranged not to permit said key to be fitted thereto for actuating said rotary member and detached therefrom even after said locking bar being fully extended without further actuation thereof through said key beyond a autorelaxing state concerning said locking bar having been frictionally driven in an autorelaxing direction thereof.

2. A device for capping a supplying opening of a fuel-tank of a motor vehicle and the like as claimed in claim 1, wherein said means for maintaining said covering portion in said resilient condition comprises an annular packing stuff of elastic material and an annular leaf spring, an annular rear surface of said covering portion, which contacts said upper peripheral surface of said supplying opening, being lined with said annular packing stuff, said packing stuff itself further being lined with said annular leaf spring.

3. A device for capping a supplying opening of a fuel-tank of a motor vehicle and the like as claimed in claim 1, wherein said rotary member fitted by said key is arranged to turn round through 90 degrees with respect to a position initially fitted by said key so that said locking bar is completely accommodated inside said shell of said plug portion, with an autorelaxing angle concerning said key fitted and said rotary member with respect to a fully actuated position of said key fitted, in which said locking bar is completely accommodated, being arranged to be 60 degrees.

4. A device for capping a supplying opening of a fuel-tank of a motor vehicle and the like as claimed in claim 1, wherein said cylinder-lock means is centrally mounted on said outer casing with an aperture to be inserted by said key for actuating said rotary member comprising a part of a top surface of said covering portion.

* * * * *